(12) United States Patent
Smith

(10) Patent No.: US 8,228,896 B2
(45) Date of Patent: Jul. 24, 2012

(54) METHOD AND APPARATUS FOR VERIFICATION OF AT LEAST A PORTION OF A DATAGRAM'S HEADER INFORMATION

(75) Inventor: Peter Ashwood Smith, Hull (CA)

(73) Assignee: Avaya Inc., Basking Ridge, NJ (US)

( * ) Notice: Subject to any disclaimer, the term of this patent is extended or adjusted under 35 U.S.C. 154(b) by 494 days.

(21) Appl. No.: 11/525,616

(22) Filed: Sep. 22, 2006

(65) Prior Publication Data
US 2008/0075079 A1 Mar. 27, 2008

(51) Int. Cl.
*H04L 12/28* (2006.01)

(52) U.S. Cl. ........................................ 370/351

(58) Field of Classification Search ............ 370/392, 370/351, 389, 395.21, 241; 713/171, 176, 713/180
See application file for complete search history.

(56) References Cited

U.S. PATENT DOCUMENTS

| | | | |
|---|---|---|---|
| 6,389,532 B1* | 5/2002 | Gupta et al. | 713/163 |
| 7,027,442 B2* | 4/2006 | Shirakawa et al. | 370/392 |
| 2006/0034179 A1* | 2/2006 | Carter et al. | 370/241 |
| 2006/0104268 A1* | 5/2006 | Lee et al. | 370/389 |
| 2007/0079307 A1* | 4/2007 | Dhawan et al. | 718/1 |
| 2007/0118750 A1* | 5/2007 | Owen et al. | 713/176 |

* cited by examiner

*Primary Examiner* — Dang Ton
*Assistant Examiner* — Kevin Lee
(74) *Attorney, Agent, or Firm* — Anderson Gorecki & Manaras LLP

(57) ABSTRACT

At least part of the information in a packet's header may be verified so that a network element may rely on the information, e.g. to provide enhanced QoS and/or to identify the source. The information may be verified by a verifying agent (VA) or a transmitting network element. Where a VA is used, the VA may sign the header information issuing its private key of a private/public key pair. The signature may take the form of a digest, certificate, or other form. Once the header information has been signed, the client may transmit packets using headers that include the signed information and may include the VA's signature as an option in the header or in another area of the packet. The VA may also transmit packets directly. The signature may be decrypted by other NEs to extract the signed information, which can then be compared with the normal header information.

11 Claims, 3 Drawing Sheets

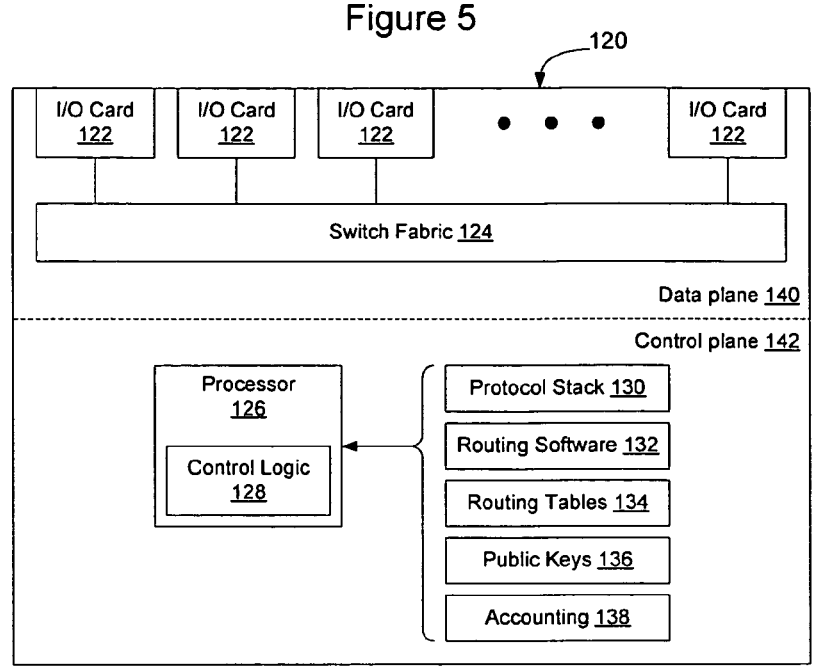

METHOD AND APPARATUS FOR VERIFICATION OF AT LEAST A PORTION OF A DATAGRAM'S HEADER INFORMATION

BACKGROUND OF THE INVENTION

1. Field of the Invention

The present invention relates to communication networks and, more particularly, to a method and apparatus for verification of at least a portion of a packet's header information.

2. Description of the Related Art

Data communication networks may include various computers, servers, nodes, routers, switches, bridges, hubs, proxies, and other network devices coupled to and configured to pass data to one another. These devices will be referred to herein as "network elements." Data is communicated through the data communication network by passing datagrams, such as Internet Protocol (IP) packets, and other logical associations of bits/bytes of data, between the network elements by utilizing one or more communication links between the devices. A particular datagram may be handled by multiple network elements and cross multiple communication links as it travels between its source and its destination over the network. As used herein, the term "packet" will be used to refer to layer 2 (link layer) and layer 3 (routing layer) datagrams, not just IP packets.

Different types of data may need to be handled differently to enable particular services to be provided by a communication network. For example, packets of data containing voice conversations and video transmissions may need to be transmitted with less jitter than other types of data traffic that will not be perceived by the end user in real time. In a data communication network, special treatment for particular packets may be signaled to the network by setting Quality of Service (QoS) bits in the packet headers. When a router receives a packet with the QoS bits set to higher level, it is supposed to give that packet priority processing treatment to speed transmission of that packet through the network.

The Internet has been developed to enable many different communication networks to communicate with each other. However, because many different networks and network elements introduce traffic onto the Internet, the routers on the Internet generally don't provide differentiated treatment to different classes of packets. More particularly, the routers on the Internet have no way of knowing whether QoS bits in a particular packet were authorized to be set or were set maliciously by an end user trying to obtain unauthorized higher priority service. Since there is no way of checking where the QoS bits were set, or who set the QoS bits, it is common to ignore those bits in an untrusted network environment such as the Internet, and at times even in private networks.

In addition to these QoS issues, it is generally not possible to determine a source of a particular packet when a packet is received. Although the Internet Protocol provides an indication of a source IP address in the header of each packet, the source IP address may be changed intentionally (spoofed) by the sending computer or another network element. Thus, the source address may not provide accurate information that can be relied upon by other network elements to identify the actual source of the packet. Where the source IP address is used in part to admit traffic to a network or network service, spoofing may be used to gain access by making it appear that the traffic originate at a trusted source when, in fact, it did not.

SUMMARY

The present invention overcomes one or more of these shortcomings by providing a way to verify at least a portion of a packet's header information, so that a network element on the communication network may rely on the information, for example to provided enhanced quality of service and/or to identify the correct source address. Combinations of verified information, such as a combination of verified source IP address and QoS bits may also be used, for example to enable the network element to charge the entity associated with the source IP address for the enhanced quality of service provided to the particular packets. Other fields may be verified as well and the verified information may be used in many ways, as described in greater detail below.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 5 is a functional block diagram of a network element configured to implement header information verification according to an embodiment of the invention.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

According to an embodiment of the invention, at least part of the information in a packet header may be verified by causing that information to be signed by a verifying agent. The verifying agent may sign the information using a private key of a private/public key pair. The signature may take the form of a digest, certificate, or other form. Once the header information has been signed, the client may transmit data using headers that include the signed information and may include the verifying agent's signature as an option in the header or in another area of the packet. When a router or other type of network element receives the packet with the signature, the network element may decrypt the signature using the verifying agent's public key and compare the information signed by the verifying agent with the information in the header. If the information matches, the network element has verified the veracity of the information in the header and may rely on the information for example to bill the sending network element for handling the packet or to provide requested quality of service to the packet.

Verification may be done when a packet first enters a domain, by multiple routers within a domain, or in another manner. Optionally, a bit may be reserved for use by routers within the domain which may be set once the header information has been verified by a router in the domain.

Figure 1:
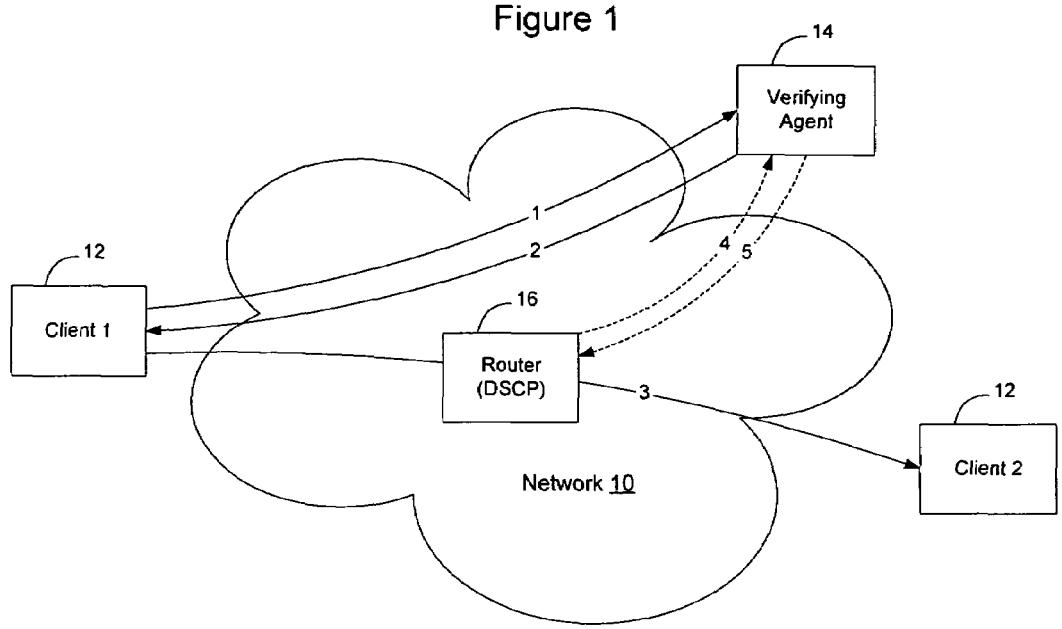
FIG. 1 is a functional block diagram a portion of an example communication network according to an embodiment of the invention.

FIG. 1 illustrates an example of an example communication network according to an embodiment of the invention. As shown in FIG. 1, a network 10 may be configured to enable clients 12 to communicate with each other. The clients may be any type of computer or other network element, and the invention is not limited by the particular types of devices that opt to use the header verification process described in greater detail herein. As the process is used additional uses will likely be discovered for the process, and the invention is not intended to be limited to the several example uses provided herein.

The network 12 may also include one or more verifying agents 14 configured to verify information, for example by signing information using a private key of a public key/private key pair. Public key/private key encryption is well known and documented, and accordingly will not be described extensively herein. Basically, public/private key encryption enables a first entity to encrypt information using a private key that only it knows, and a second entity to decrypt the information using a publicly known key. If the second entity uses the first entity's public key, it will be able to determine the information that was encrypted by the first entity. If the second entity is not able to decrypt the information, it knows that it either is using the wrong public key or that the first entity didn't encrypt the information.

As described in greater detail herein, the verifying agent 14 may be used to sign at least part of the information in the header of packets to be used in connection with transmissions from a first client to a second client. For example, the verifying agent may create a digest of the header which entails selecting portions of the header and encrypting those portions or a hash of those portions using the verifying agent's private key. The verifying agent may also include a certificate to certify part of the information in the header. Many other ways of signing the information may be used as well.

Assume, for example as shown in FIG. 1, that client 1 would like to transmit data to client 2, and that client 1 wanted the network to provide enhanced quality of service. To enable the network to verify that client 1 was entitled to a higher type of quality of service, the network may require client 1 to verify the quality of service bits and, optionally, to also verify its identity so that it can be billed for the transmission.

According to an embodiment of the invention, client 1 may request the verifying agent 14 to sign header information that client 1 will use to communicate with client 2 (arrow 1). To do this, client 1 may pass the header information to the verifying agent, which may digitally sign all or part of the information passed to it and may also include additional information such as the time at which the verifying agent signed the information, the amount of time the signature is valid, and other types of qualifying information configured to enable entities that decrypt the signature to understand the limitations associated with the signature. Examples of several aspects of the header that may be signed are discussed below in connection with FIG. 3.

Once the information is signed, the verifying agent 14 will pass at least the signature back to client 1 (arrow 2), so that client 1 may use the signature in communications with client 2 on the network. The signature may take the form of a digest, certificate, or another form. Many ways of securely transmitting information between the client 1 and the verifying agent 14 have been developed, and the invention is not limited to any particular way in which the client 12 and verifying agent 14 interact.

The client 12 may then use the signature in connection with communications on the network 10, for example in connection with communications with client 2. One way in which this may occur, where the network 10 is an Internet Protocol (IP) based network, is to include the signature as an option in the IP packet header. This is discussed in greater detail below. However, the invention is not limited to this particular manner as other ways of incorporating the signature into the packet may be used as well.

Since the signature is associated with information that is contained in the headers of the packets that are to be used to transmit data on the network, the same signature may be used regardless of the particular data to be transmitted. Stated another way, the signature is independent of the data that the client 1 would like to transmit to client 2, so that the signature may be used many different times. This allows the client to encrypt its data if desired to prevent the data from being able to be visible to intermediate network elements or other clients on the network. Further, since the signature verifies at least some of the information in the header, the network elements on the network are able to verify that at least those verified portions of the header is valid, so that they are more likely to trust the information when forwarding the packets on the network.

In operation, if a network element receives a packet having a signature, it may optionally decrypt the signature to extract the signed information and compare the signed information with the information in the header. Since the header information is not encrypted, the network element does not need to verify the header information to forward the packet. However, if the network element is interested in verifying the header information, it may do so by decrypting the signature using the verifying agent's public key. If the network element does not have the verifying agent's public key, it may obtain the public key from the verifying agent 14 (arrows 4 and 5), key server, or in other known ways. The invention is not limited by the particular manner in which the network elements obtain the verifying agent's public key. By comparing the information in the signature with the header information, the network element may determine if any of the verified header information has been altered.

Figure 2:
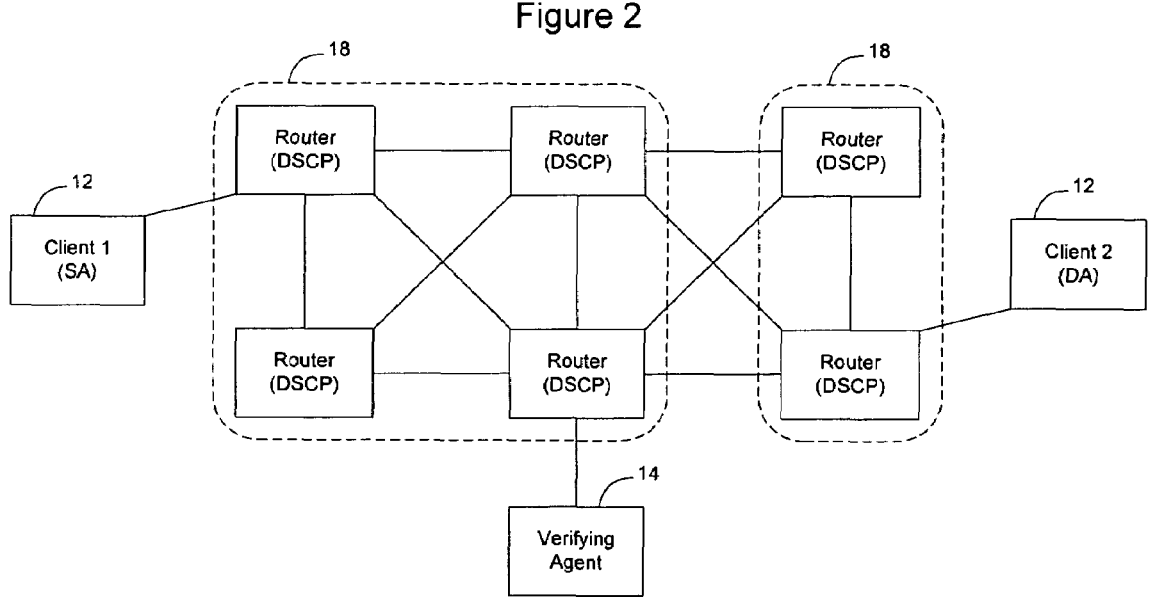
FIG. 2 is a functional block diagram of a portion of another example communication network according to an embodiment of the invention.

A communication between clients may be required to cross multiple network domains, each of which may be operated by a different operator. For example, as shown in FIG. 2, the network may include two or more autonomous domains 18. Since the verifying agent is able to be trusted by each of the domains, packets that include a signature from the verifying agent may be verified by one or more network elements in each domain so that each domain may verify, for itself, whether the header information of a particular packet is valid. Optionally, once this is performed in the domain, a bit may be set in the packet to indicate that the header information has been verified so that not all network elements in the domain are required to verify the header information of the packets.

The header information may be verified in every packet, in the first packet in a flow, in a select number of packets in a flow, or in some other manner. Optionally, the information in the header may be verified on demand, for example where one of the network elements that is required to handle the traffic requests that the header information be verified.

Figure 3:
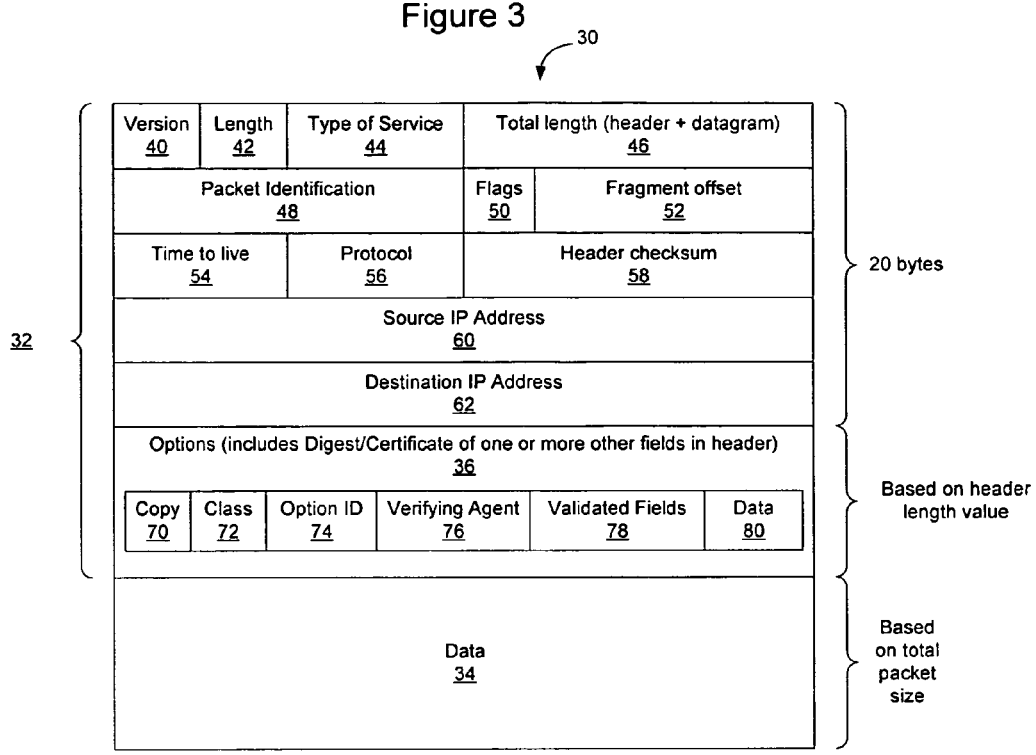
FIG. 3 is a functional block diagram of a packet format according to an embodiment of the invention.

FIG. 3 illustrates an Internet Protocol (IP) packet in which a signature has been included as an option to verify at least a portion of the other header information. As mentioned above, the invention is not limited to the use of an IP header, as other types of headers that are commonly used in connection with other layer 2 (link layer) and layer 3 (routing layer) protocols may be verified using a similar process. Thus, although it is currently envisioned that embodiments of the invention may be used in connection with IP headers, such as IPv4 or IPv6 headers, the invention may also be applied to hop-by-hop forwarded L2 or L3 packet based protocol data units such as Frame Relay and Ethernet frames.

Additionally, applicants note that the process may not be applicable to all layer 2 and layer 3 protocols, since some protocols such as ATM and MPLS are designed such that the header of a given protocol data unit will change at each hop in the network. Thus, verification of the outer header may not be desirable in networks of this nature.

As shown in FIG. 3, an IP packet 30 has a header 32 and a payload 34. Usually, the IP header is 20 bytes in length, although the IP protocol provides for the header to be extended to include one or more options 36. This options field 3 may be used, according to an embodiment of the invention, to carry a signature of one or more of the other fields of the header 32 so that one or more of the fields of the header may be verified. Since the verification does not affect the data portion of the packet 30, the data may be encrypted separately by the client and inclusion of the signature may be used by a particular client or network element on behalf of the client independent of the data that is to be carried in the packet. As noted in FIG. 3, the signature may include a digest, certificate, or other piece of information that may be decrypted to validate the header. The signature may also contain other information from the signing authority as well, such as a time stamp, expiration date/time, or other qualifying information.

The IP packet header 32 has many fields. The first field is a version type field 40, which indicates the version of IP that was used to create the packet. The IP packet header 32 also includes a length value 42 which specifies the number of 32 bit words that form the header. Typically, where the packet doesn't include any options, the length value 42 is set to five (20 bytes). Where validation is used as an option, the length value 42 will need to be increased to accommodate the additional validation information.

The IP header also includes a type of service field 44 (also referred to as Differentiated Services Code Point) that may allow the particular quality of service (QoS) indication to be indicated for the packet. The DSCP defines the way routers should queue packets while they are waiting to be forwarded. In the current version of the standard (IP V.4) the type of service field 44 has 8 bits which may be used to indicate different things, as set forth below in Table I. Other standards may define the values of the type of service bits differently and the invention is not limited to an embodiment that uses these particular values.

TABLE I

| Bit | Description | Value |
|---|---|---|
| 0-2 | Precedence | 0 = routine |
|   |   | 1 = priority |
|   |   | 2 = Immediate |
|   |   | 3 = Flash |
|   |   | 4 = Flash override |
|   |   | 5 = Critic/ECP |
|   |   | 6 - Internetwork control |
|   |   | 7 = Network control |
| 3 | Delay | 0 = normal delay |
|   |   | 1 = low delay |
| 4 | Throughput | 0 = normal throughput |
|   |   | 1 = high throughput |
| 5 | Reliability | 0 = normal reliability |

TABLE I-continued

| Bit | Description | Value |
|---|---|---|
|   |   | 1 = high reliability |
| 6 | Monetary Cost | 0 = normal monetary cost |
|   |   | 1 = minimize monetary cost |
| 7 | 0 | 0 |

The header also includes a field 46 that may be used to specify the total length of the IP packet 30. The total length is specified in bytes and represents the combined length of the header 32 (including the options field) and the data 34.

The header also contains a packet identification field 48 that may be used together with the source address to uniquely identify this packet. The identification field is frequently used during reassembly of fragmented datagrams.

Next, the header contains a series of three flags 50 that are used to control fragmentation and to indicate if the datagram contains additional fragments or to indicate the parts of the packet to the receiver. One of the flags (flag 00) is reserved and is generally set to zero. Optionally this flag may be used as a verification flag to indicate to a network element handling the packet that one or more aspects of the header is verified in the option field, or to indicate that verification has been performed by another network element within the domain.

The IP header 30 also includes a fragment offset field 52 to enable a router that has performed fragmentation to indicate the number of bytes from the start of the original sent packet where the fragmentation occurred. This helps a receiving router to recreate the original packet.

The IP header 30 includes a time to live field 54 that may be used to specify the number of hops/links over which the packet may be routed before it should be dropped from the network. Most routers will decrement this value in connection with forwarding the packet so that the packet will only survive a particular amount of time on the network. The time to live field may be used to cause packets to die after a given period of time to reduce the effects of accidental routing loops.

The IP header also has a protocol field 56 that may be used to specify the particular type of transport packet being carried by the packet 30. For example, the value 1 is used to indicate ICMP, value 2—IGMP, value 6=TCP, and value 17=UDP. Although these are several of the common values, the protocol field 56 has 8 bits, and many of the values have been assigned to refer to particular types of transport packets. Optionally, one or more of these values could be used to indicate that parts of the header are verified in the options, and/or to indicate the particular verifying agent, or which key should be used to decrypt the signature information.

The IP header has a header checksum field 58 which is a 1's complement checksum inserted by the sender and updated whenever the packet header is modified by a router. The header checksum field is generally used to detect processing errors that may have been introduced by a router or bridge where the packet is not protected by a link layer cyclic redundancy check. Where the options field is used to verify data in the header, since the option field is part of the header, the checksum would also ordinarily be used to verify that the options field had not been modified inadvertently.

The IP header has two address fields—a source IP address field 60 and a destination IP address field 62, that are used to identify the source of the packet and the intended destination of the packet. Each address field is 32 bits in length.

The header 30 may also include the options field 36, which as discussed above may be of variable length. Where included, the first byte of the options field 36 is used to specify aspects about the option and the rest of the option field is then used to contain the option data or is used as padding to ensure that the total length of the options field is a multiple of 32 bits so that the data field 34 will start in an expected location.

The first byte of the options field 36 includes three parts—a one bit copy flag 70, a two bit class value 72, and a five bit option identifier 74. The copy flag indicates whether the option is to be copied into all fragments. (0=do not copy; 1=copy). The two bit class value is used to indicate the class of the packet (0=control; 2=debugging and measurement; 1 and 3=reserved). Optionally, one of the class values may be used to indicate that the options field contains verification information relating to one or more aspects of the header. The option identifier 74 is a five bit field that is used to identify which type of option is included in the packet. Several of the option types are defined by various RFCs, although many types of options may also be vendor specific. According to an embodiment of the invention, one or more class types may be defined, either via standard or in a vendor specific manner, to enable at least a portion of the header of a packet to be verified, so that a router or other network element may determine how to use the signature information contained in the options field.

After the first byte, the structure of the options field generally depends on the type of option and may vary greatly depending on the particular option being used. Where the signature information from the verifying agent is to be incorporated into the options field, either the structure will need to conform to a particular format or the packet will need to contain information to enable a receiving network element to determine the format of the verification information. Thus, part of the options field may be used to instruct the router how to interpret the option, although the invention is not limited to an embodiment that implements this feature.

When a router receives a packet with verification information in the options field, the router may optionally obtain the public key associated with the verification agent that signed the information, and decrypt the information. The decrypted information may be compared with the header information that was contained in the header in unencrypted form, and a comparison may be made to verify that the header information has not been tampered.

One way in which information in the header may be verified is to have the verification agent create a digest of the header, encrypt the digest, and then have the encrypted digest included in the options field. The signature, in this embodiment, would be the encrypted digest. A digest is a collection of one or more selected portions of a document, which in this instance may include selected portions (i.e. fields or subfields) of the header. The selected portions may include whole fields of the IP header, such as the fields described above, or may include partial fields of the IP header. Alternatively, the entire header may be validated, although this may require significant space in the options field thus incurring significant overhead. None-the-less, the invention is not limited to an embodiment in which a digest is created as alternatively all or substantially all of the information in the header may be included in encrypted form in the options field so that all or substantially all of the information in the header may be validated upon demand by a receiving network element or by the intended recipient.

There are many different combinations of fields that may be verified, and the description contained herein will not attempt to list them all. Similarly, the invention is not limited to one or two different combinations of fields that may be verified. However, to illustrate several ways in which the validation may be used, several examples will be provided. The invention is not limited to these particular examples.

The header contains several fields that may vary from packet to packet. For example, the total length field 46, packet identification field 48, fragment offset field 52, and protocol field 56 may vary from packet to packet, even though those packets were sent by the same client. Similarly, one or more of the fields in the IP header may contain information that changes as the packet passes through the network. For example, the time to live field 54 may be updated as the packet traverses the network and the header checksum field 58 may be changed whenever the packet header changes.

Where a signature received from a verification agent is to be used for more than one packet, the signature may be formed as a digest that validates other fields of the header that are not expected to change. For example, the source address field 60, the type of service field 44, the length field 42, and the version field 40 may be verified using a digest. Optionally, where the signature is to be used for communications with a particular destination, the destination field 52 may also be verified by being included in the digest.

Different combinations of information may be used to enable different services to be performed in connection with the packet. For example, where it is desired to enable routers on the Internet to verify the quality of service associated with a packet, a digest may be created only including the type of service field 44 or a portion of the type of service field 44 such as the first three bits of the type of service field. The digest may also include other information as well such as the source address, etc.

Verification of the source address, alone or in combination with other identifying information, may enable the network elements handling the packets to keep track of which packets were handled for which client. Since the network elements are able to verify the source of the packet, the network elements may charge the entity for handing the packet. Similarly, verification of the destination address may provide the packet with higher quality of service and enable the network elements to charge the intended destination for handling the packet. For example, clicking on a link on a web page advertisement may cause an encrypted header to be applied to the packets associated with the link, so that the routers on the network will provide the traffic associated with the link with priority service. The entity associated with the advertisement may then be charged for the premium service provided to the packets. Packet source verification may also be used for other purposes, such as administration and admission control, and may have other applications in addition to the several examples provided herein. Similarly, where the quality of service bits have been set, the routers providing priority services may also charge the clients higher fees for providing the priority services.

In particular instances, it may be desirable to include additional information in the option field that will enable the network elements using the validation information to understand the content of the option field. Information of this nature will be referred to herein as "administrative information". Thus, the option field may contain administrative information in addition to signature information. For example, since more than one verifying agent may be used on a network, particularly on a large network such as the Internet, a part of the administrative information may include a way to identify the verifying agent. In the example embodiment shown in FIG. 4, several bits forming a verifying agent field 76 just after the first byte of the options field are shown as being used to identify the verifying agent. The invention is not limited in this manner as a different way of identifying the verifying agent may be used as well.

Similarly, since the header includes 12 fields and 20 bytes of normal data (other than the options field), and since any combination of data may be verified, it may be desirable for the administrative information to include a field indicating which aspects of the header are validated. For example, a 12 bit validated field identifier 78 may be used to specify which of the 12 fields discussed above (40-60) are validated in the signature. Where the validated field identifier is visible outside the signature a receiving router may determine by inspecting this field which of the header fields are validated in the option. Alternatively, this may be included in the signature and not visible without decryption. Other ways of formatting the signature and conveying the meaning of the information contained in the signature may be used as well, and the invention is not limited to this particular example.

The signature may include other information in addition to the verified header information. For example, the signature may include the time of the signature, the intended expiration date/time of the signature, and other information that may enable a network element that receives a packet containing the signature to evaluate the strength of the signature. Other information may be contained as well and the invention is not limited to these particular examples.

Figure 4:
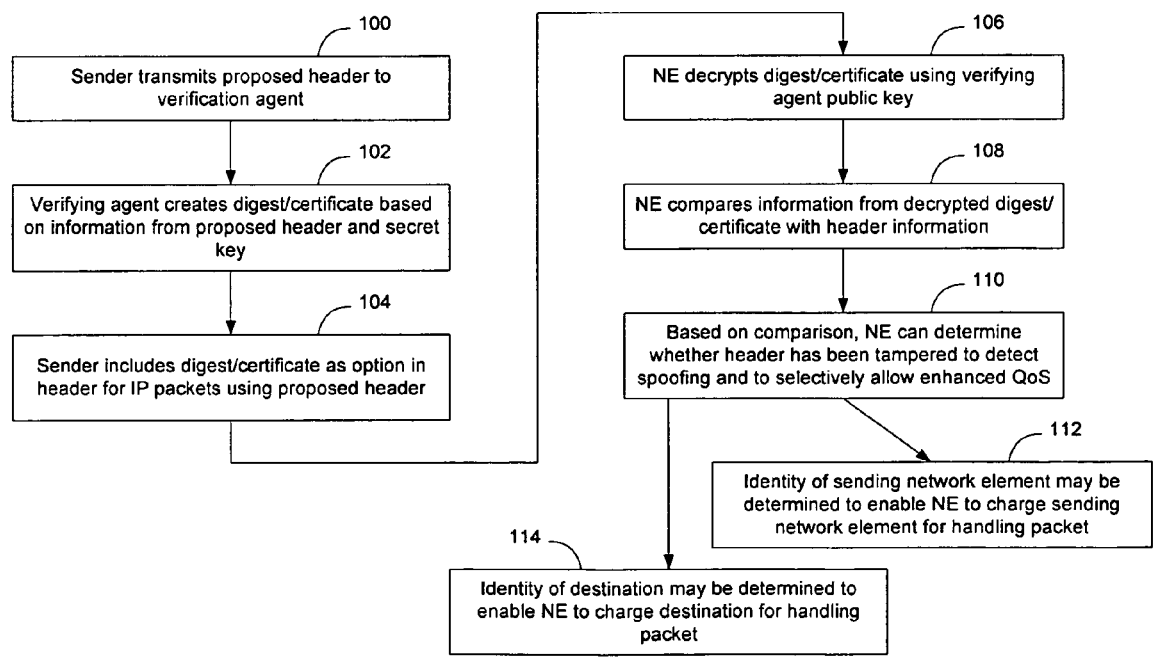
FIG. 4 is a flow chart illustrating a process of using signature information to verify a portion of the information in a header of a packet according to an embodiment of the invention.

FIG. 4 illustrates a flow chart of an example process that may be used to implement an embodiment of the invention. In the embodiment shown in FIG. 4, when the sender would like to have a particular header or portion of a header verified, the sender will send the proposed header to a verification agent (100). A given client (sender) may optionally send several different combinations of header information to be validated at once, so that the different signatures may be available for use by the client in connection with appropriate packets. For example, a client could be configured to transmit data on a VPN and need to transmit data to a specific collection of IP addresses. The client may obtain signatures for each source address/destination address pair, along with each class of service value, and use these signatures as appropriate when communicating on the VPN.

By obtaining signatures in advance, the signatures need not be obtained in real time from the verifying agent, so that the client is not dependent on the verifying agent to generate headers in real time. Alternatively, the client may transmit data to the verifying agent which may then sign the headers of the packets on behalf of the client in real time as the packets are transmitted on the network.

The verifying agent will create the signature, such as the digest/certificate, based on information from the proposed header that was received from the client/sender and the verifying agent's private key (102). The verifying agent will then pass the signature back to the client/sender to enable the client to include the signature in outgoing packets. Although in this embodiment it has been assumed that the sender would include the signature the invention is not limited in this manner as the verifying agent may also participate in sending the packets such as by having the client send the packets to the verifying agent and having the verifying agent update the header by including the signature in the options field and updating the header checksum. The client may be the sender or another network device acting on behalf of the sender, such as an access router. Where the access router is configured to add the signature information, the maximum transmission unit allowed by the sender may be reduced slightly to enable the access router to add additional information to the header without requiring the packets to be fragmented before transmission.

As shown in FIG. 4, the sender (or another network element on behalf of the sender) includes the signature in headers for packets with the verified information, and then sends the packets onto the network (104).

Upon receipt by a network element, the network element may elect to verify whether all or part of the header information is valid. To do this, the network element will obtain the verifying agent's public key and decrypt the signature using the public key (106). The network element may then compare the information obtained from the signature with the information contained in the header to determine if the header information and the previously encrypted header information that was reproduced from the option field are the same (108). Based on this comparison, the network element can determine whether the header contains valid information or has been tampered with. This may allow the network element to detect spoofing, whether the packet is entitled to enhanced quality of service, and many other aspects of the packet (110). Optionally, where the source address is verified, the identity of the sending network element may be determined to enable the network element to charge the sending network element for handling the packet (112). Similarly, where the destination address is verified, the identity of the destination network element may be determined to enable the network element to charge the intended destination for handling the packet (114).

Although an embodiment has been described in which a third party verifying agent has been used to generate the signature information, the invention is not limited in this manner as other trusted relationships may be used in connection with generation of the signature information. For example, the clients 12 in FIG. 1 may have a trusted relationship, for example through the exchange of key information, which may be used to generate signatures of the headers. For example, a sending client may sign packet headers generated by it that may then be decrypted by a firewall at the receiving client. Where the header information matches the decrypted signature information, the packets may be admitted through the firewall optionally via a port other than port 80. Thus, the invention is not limited to an embodiment in which a third party verifying agent is used to generate the signatures.

Although an embodiment has been described in which the IP options field has been used to carry the signature information, the invention is not limited in this manner as other parts of a packet may be used to contain this information as well. For example, a trailer could be used to carry a signature of the header, a new field may be inserted after the header, or a new protocol or protocol version may be defined that explicitly provides for inclusion of a signature of a portion or all of the information in the header. Thus, the signature information may be carried in many different ways without departing from the scope of the invention.

FIG. 5 shows a functional block diagram of a network element configured to receive packets containing partially verified header information according to an embodiment of the invention. The invention is not limited to the embodiment shown in FIG. 5 however, as many other types of network elements and network elements with architectures different than that shown in FIG. 5 may be used as well.

In the embodiment shown in FIG. 5, the network element 120 includes a data plane 140 including a plurality of input/output cards 122 configured to receive data from a communication network and output data on to the communication network. The input/output cards may all perform both input and output functions or may selectively perform only one of these functions. Data may be switched between the cards via switch fabric 124. Optionally, the data plane may contain one or more service cards, such as one or more cards configured to perform decryption on the headers, and the invention is not limited to an embodiment in which only the particular illustrated cards are used to implement the data plane of the network element 120.

The manner in which data is handled by the network element 120 is controlled by a control plane 142 generally including a processor 126 containing control logic 128. The control plane may be implemented as one or more control cards/data service cards and the invention is not limited by the particular manner in which the control plane is implemented.

The control logic 128 may implement one or more processes, such as a process to implement a protocol stack 130 to enable the network element to understand the IP header information described herein. The control logic may also implement a process designed to implement routing software 132 optionally in communication with routing tables 134, so that the network element may make routing decisions based on the routing information associated with the packets. The routing decisions may be programmed into the data plane so that packets of data received by the network element are able to be automatically forwarded by the network element without intervention by the control plane as is well known in the art.

The processor may also have available one or more public keys 136 that may be used to decrypt the signature information associated with packets being handled by the network element. The public keys may be maintained by the control plane and used by the control plane to decrypt header information of selected packets or may be programmed into the data plane so that the data plane may automatically decrypt the signature information in connection with making routing decisions on packets received from the network. The invention is not limited to the particular manner in which the decryption is implemented on the network element as the decryption process may be implemented either in the control plane or the data plane, or both. For example, the data plane may perform the decryption process in connection with normal data packets while the control plane may do so in connection with control packets intended to be terminated on the network element.

Where the verification information is to be used to bill clients for particular packets handled by the network element, the network element may also include an accounting process 138 that will allow the network element to keep track of packets associated with particular verified source address. This may be implemented, for example, through the use of a set of counters configured to count verified packets for clients or in another manner. Optionally, those packets that are verified or a hash of the packets may be stored to verify at a later time that the network element handled the packets on behalf of the verified client. Other modules may be included as well and the invention is not limited to a particular implementation of the network device.

The functions described above may be implemented as a set of software program instructions that are stored in a computer readable memory within the network element and executed on one or more processors within the network element. However, it will be apparent to a skilled artisan that all logic described herein can be embodied using discrete components, integrated circuitry such as an Application Specific Integrated Circuit (ASIC), programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of verifying the accuracy of a value contained in at least a portion of a header of a layer 2 or layer ′packet formed using a layer 2 or layer 3 protocol, the method comprising the steps of:
    receiving the layer 2 or layer 3 packet by a router or switch required to make a routing or switching decision for the layer 2 or layer 3 packet using information in a header of the layer 2 or layer 3 packet, the header containing a source address field, a destination address field, a plurality of other header fields, and encrypted signature information, the encrypted signature information relating to at least to a portion of the header including at least the source address field or the destination address field and the encrypted signature information being part of the header of the layer 2 or layer 3 packet when the layer 2 or layer 3 packet is received by the router;
    comparing, by the router or switch, information associated with the signature information with the portion of the header to determine if the signature information and the portion of the header are consistent to verify the accuracy of a value contained in the portion of the header; and
    if the information associated with the signature information and the value of the portion of the header are consistent, implementing a quality of service specified by the header in connection with implementing the routing or switching decision for the layer 2 or layer 3 packet;
    wherein the encrypted signature information is created from fields of the header that are common to a plurality of packets transmitted by a given sender to enable the same encrypted signature information to be used by the sender in connection with transmission of each of the plurality of packets;
    wherein the encrypted signature information is an encrypted digest of the header information; and
    wherein the digest is created from a quality of service field, the source address and the destination address.

2. The method of claim 1, wherein the encrypted signature information was encrypted using a private key of a public key/private key encryption system.

3. The method of claim 1, wherein the step of comparing comprises decrypting the encrypted signature information and comparing the decrypted signature information with the portion of the header.

4. The method of claim 3, wherein the signature information is generated by a validating agent having a private key and a public key, and wherein the step of decrypting the encrypted signature information comprises using the public key to decrypt the encrypted signature information.

5. The method of claim 1, wherein the layer 2 protocol is a link layer protocol, and wherein the layer 3 protocol is a routing layer protocol.

6. The method of claim 5, wherein the packet is an Internet Protocol (IP) packet.

7. The method of claim 6, wherein the encrypted signature information is contained as an option in the IP packet.

8. A non-transitory computer-readable medium containing instructions for controlling at least one processor to perform a method of evaluating the accuracy of a value contained in a header of an Internet Protocol (IP) packet in connection with making a routing or switching decision for the IP packet on a communication network, the method comprising the steps of:

receiving an IP packet having an IP header and a data portion, the IP header having a source IP address field, a destination IP address field, and a plurality of other header fields, at least one of the plurality of other header fields containing an encrypted digest of a portion of the IP header including the source IP address field, the encrypted signature information being part of the IP header when the IP packet is received;

decrypting the encrypted digest; and verifying the accuracy of a value contained in the portion of the IP header, including the source IP address field, by comparing the decrypted digest with the portion of the IP header to determine if the information in the decrypted digest matches the information in the portion of the IP header in connection with making the routing or switching decision for the IP packet on the communication network;

wherein the digest is created from fields of the IP header that are common to a plurality of packets transmitted by a given sender to enable the same digest to be used in connection with the plurality of packets; and wherein the IP header further includes a type of service field containing type of service information, wherein the source IP address field containing a source IP address, wherein the destination IP address field containing a destination IP address, and wherein the encrypted digest contains digest information including the type of service information, the source IP address, and the destination IP address.

9. The computer-readable medium of claim 8, wherein the step of decrypting the encrypted digest comprises accessing a public key, and using the public key to decrypt the encrypted digest.

10. The computer-readable medium of claim 9, wherein the public key is associated with a verifying agent.

11. The computer-readable medium of claim 10, wherein the encrypted digest was created by the verifying agent.

* * * * *